United States Patent
Iimori et al.

(10) Patent No.: US 7,085,312 B2
(45) Date of Patent: Aug. 1, 2006

(54) SPREAD SPECTRUM COMMUNICATION APPARATUS AND METHOD OF CONTROLLING THE SAME

(75) Inventors: Eiji Iimori, Hino (JP); Masami Morimoto, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 770 days.

(21) Appl. No.: 10/241,484

(22) Filed: Sep. 12, 2002

(65) Prior Publication Data

US 2004/0004996 A1 Jan. 8, 2004

(30) Foreign Application Priority Data

Jul. 5, 2002 (JP) ............................ 2002-196951

(51) Int. Cl.
*H04B 1/69* (2006.01)

(52) U.S. Cl. ...................................... 375/147; 375/148

(58) Field of Classification Search ................ 375/130, 375/136, 141, 144, 146–148; 455/343.1, 455/343.2, 343.5, 334, 130, 524, 517, 507, 455/500, 39

See application file for complete search history.

(56) References Cited

U.S. PATENT DOCUMENTS 5,428,820 A * 6/1995 Okada et al. ............. 340/7.33
5,574,747 A * 11/1996 Lomp ........................ 375/144
5,708,658 A * 1/1998 Sugita ........................ 370/335
6,016,312 A   1/2000 Storm et al.
6,088,602 A * 7/2000 Banister ..................... 455/574
6,363,101 B1   3/2002 Sudo et al.
6,574,200 B1* 6/2003 Tsumura .................... 370/311
6,639,907 B1* 10/2003 Neufeld et al. ............. 370/342

FOREIGN PATENT DOCUMENTS

| EP | 1 033 823 A1 | 9/2000 |
| JP | 2000-333585 | 10/2000 |
| WO | WO 01/18985 | 3/2001 |
| WO | WO 01/65714 | 9/2001 |

* cited by examiner

*Primary Examiner*—Tesfaldet Bocure
*Assistant Examiner*—Vineeta Panwalkar
(74) *Attorney, Agent, or Firm*—Finnegan, Henderson, Farabow, Garrett & Dunner, L.L.P.

(57) ABSTRACT

Ending of a sleeping period is managed by, for one portion thereof, first clock signals being counted by a first clocking section, and for a remaining portion thereof, second clock signals being counted by a second clocking section. At this time, a count number by which the first clock signals are counted and a count number by which the second clock signals are counted are corrected on the basis of changes of a center of gravity in a distribution of timings of a plurality of paths.

21 Claims, 12 Drawing Sheets

| Number | Error calculating conditions | Numerical value |
|---|---|---|
| ① | Maximum PPM offset of low-speed clock | ±2.3 chip(=0.6ppm/s) |
| ② | Extended range of multipath | ±77 chip(=±20us) |
| ③ | Deviation of high-speed clock and Doppler deviation | ±1 chip |
| ④ | Steadily necessary window width(=②+③) | ±78 chip |
| ⑤ | Default window width | ±128 chip |
| ⑥ | Allocated amount to deviation of low-speed clock(=⑤-④) | ±50 chip |

| Number | Frequency offset of low-speed clock [chip] | | | | |
|---|---|---|---|---|---|
| 1 | Waiting period [s] | 1DRX | 2DRX | 3DRX | 4DRX |
| 2 | 0.64 | 1.472 | 2.944 | 4.416 | 5.888 |
| 3 | 1.28 | 2.944 | 5.888 | 8.832 | 11.776 |
| 4 | 2.56 | 5.888 | 11.776 | 17.664 | 23.552 |
| 5 | 5.12 | 11.776 | 23.552 | 35.328 | 47.104 |

| Number | Phase shifts appearing in DRX [chip] | | | | |
|---|---|---|---|---|---|
| 1 | Waiting period [s] | 1DRX | 2DRX | 3DRX | 4DRX |
| 2 | 0.64 | 0.47104 | 1.88416 | 4.23936 | 7.53664 |
| 3 | 1.28 | 1.88416 | 7.53664 | 16.95744 | 30.14656 |
| 4 | 2.56 | 7.53664 | 30.14656 | 67.82976 | 120.58624 |
| 5 | 5.12 | 30.14656 | 120.58624 | 271.31904 | 482.34496 |

| Number of times of sleeping | Fluctuation in multipath | Fluctuation error in low-speed clock | Sleeping path search results (center of gravity of original multipath) | Sleeping path search request (center of gravity of new multipath) | Adjust32 New | Correcting direction this time |
|---|---|---|---|---|---|---|
| 0 | 0 | 0 | 1000 | 1000 | 0 | 0 |
| 1 | 0 | 0 | 1000 | 1000 | 0 | 0 |
| 2 | 0 | 100 | 1000 | 1000 | 0 | 0 |
| 3 | 0 | 100 | 1100 | 1030 | 30 | 30 |
| 4 | 0 | 100 | 1170 | 1060 | 60 | 30 |
| 5 | 0 | 100 | 1210 | 1090 | 90 | 30 |
| 6 | 0 | 100 | 1220 | 1120 | 120 | 30 |
| 7 | 0 | 100 | 1200 | 1150 | 150 | 30 |
| 8 | 0 | 100 | 1150 | 1150 | 150 | 0 |
| 9 | 0 | 100 | 1100 | 1120 | 120 | -30 |
| 10 | 0 | 100 | 1080 | 1090 | 90 | -30 |
| 11 | 0 | 100 | 1090 | 1090 | 90 | 0 |
| 12 | 0 | 0 | 1100 | 1100 | 100 | 10 |
| 13 | 0 | 0 | 1100 | 1100 | 100 | 0 |
| 14 | 0 | 0 | 1100 | 1100 | 100 | 0 |
| 15 | 0 | 0 | 1000 | 1070 | 70 | -30 |
| 16 | 0 | 0 | 930 | 1040 | 40 | -30 |
| 17 | 0 | 0 | 890 | 1010 | 10 | -30 |
| 18 | 0 | 0 | 880 | 980 | -20 | -30 |
| 19 | 0 | 0 | 900 | 950 | -50 | -30 |
| 20 | 0 | 0 | 950 | 950 | -50 | -30 |

FIG. 10A

| Number of times of sleeping | Fluctuation in multipath | Fluctuation error in low-speed clock | Sleeping path search results (center of gravity of original multipath) | Sleeping path search request (center of gravity of new multipath) | Adjust32 New | Correcting direction this time |
|---|---|---|---|---|---|---|
| 0 | 100 | 0 | 1000 | 1000 | 0 | 0 |
| 1 | 30 | 0 | 1100 | 1030 | 30 | 30 |
| 2 | 0 | 0 | 1100 | 1060 | 60 | 30 |
| 3 | -30 | 0 | 1040 | 1040 | 40 | -20 |
| 4 | 0 | 0 | 970 | 1010 | 10 | -30 |
| 5 | -50 | 0 | 960 | 980 | -20 | -30 |
| 6 | 70 | 0 | 930 | 950 | -50 | -30 |
| 7 | 20 | 0 | 1050 | 980 | -20 | 30 |
| 8 | -30 | 0 | 1090 | 1010 | 10 | 30 |
| 9 | 30 | 0 | 1050 | 1040 | 40 | 30 |
| 10 | 50 | 0 | 1040 | 1040 | 40 | 0 |
| 11 | 10 | 0 | 1050 | 1050 | 50 | 10 |
| 12 | -40 | 0 | 1020 | 1020 | 20 | -30 |
| 13 | 20 | 0 | 950 | 990 | -10 | -30 |
| 14 | 5 | 0 | 980 | 980 | -20 | -10 |
| 15 | -30 | 0 | 1005 | 1005 | 5 | 25 |
| 16 | 25 | 0 | 970 | 975 | -25 | -30 |
| 17 | 0 | 0 | 1020 | 1005 | 5 | 30 |
| 18 | 0 | 0 | 1015 | 1015 | 15 | 10 |
| 19 | 0 | 0 | 1000 | 1000 | 0 | -15 |
| 20 | 0 | 0 | 1000 | 1000 | 0 | 0 |

FIG. 11A

| Number of times of sleeping | Fluctuation in multipath | Fluctuation error in low-speed clock | Sleeping path search results (center of gravity of original multipath) | Sleeping path search request (center of gravity of new multipath) | Adjust32 New | Correcting direction this time |
|---|---|---|---|---|---|---|
| 0 | 100 | 0 | 1000 | | 0 | 0 |
| 1 | 30 | 0 | 1100 | 1030 | 30 | 30 |
| 2 | 0 | 100 | 1100 | 1060 | 60 | 30 |
| 3 | -30 | 100 | 1140 | 1090 | 90 | 30 |
| 4 | 0 | 100 | 1120 | 1120 | 120 | 30 |
| 5 | -50 | 100 | 1100 | 1100 | 100 | -20 |
| 6 | 70 | 100 | 1050 | 1070 | 70 | -30 |
| 7 | 20 | 100 | 1150 | 1100 | 100 | 30 |
| 8 | -30 | 100 | 1170 | 1130 | 130 | 30 |
| 9 | 30 | 100 | 1110 | 1110 | 110 | -20 |
| 10 | 50 | 100 | 1130 | 1130 | 130 | 20 |
| 11 | 10 | 100 | 1150 | 1150 | 150 | 20 |
| 12 | -40 | 100 | 1110 | 1120 | 120 | -30 |
| 13 | 20 | 100 | 1050 | 1090 | 90 | -30 |
| 14 | 5 | 0 | 1080 | 1080 | 80 | -10 |
| 15 | -30 | 0 | 1005 | 1050 | 50 | -30 |

FIG. 12A

| Number | Waiting period [s] | Window width which should be used after X periods [chip] | | | |
|---|---|---|---|---|---|
| | | 1DRX | 2DRX | 3DRX | 4DRX |
| 1 | 0.64 | ±128 [0x0040] | ±128 [0x0040] | ±128 [0x0040] | ±128 [0x0040] |
| 2 | 1.28 | ±128 [0x0040] | ±128 [0x0040] | ±128 [0x0040] | ±192 [0x0060] |
| 3 | 2.56 | ±128 [0x0040] | ±192 [0x0060] | ±256 [0x0080] | ±256 [0x0080] |
| 4 | | ±192 [0x0060] | ±256 [0x0080] | ±256 [0x0080] | ±256 [0x0080] |
| 5 | Control at 5.12→2.56 [s] | | | | |

FIG. 13

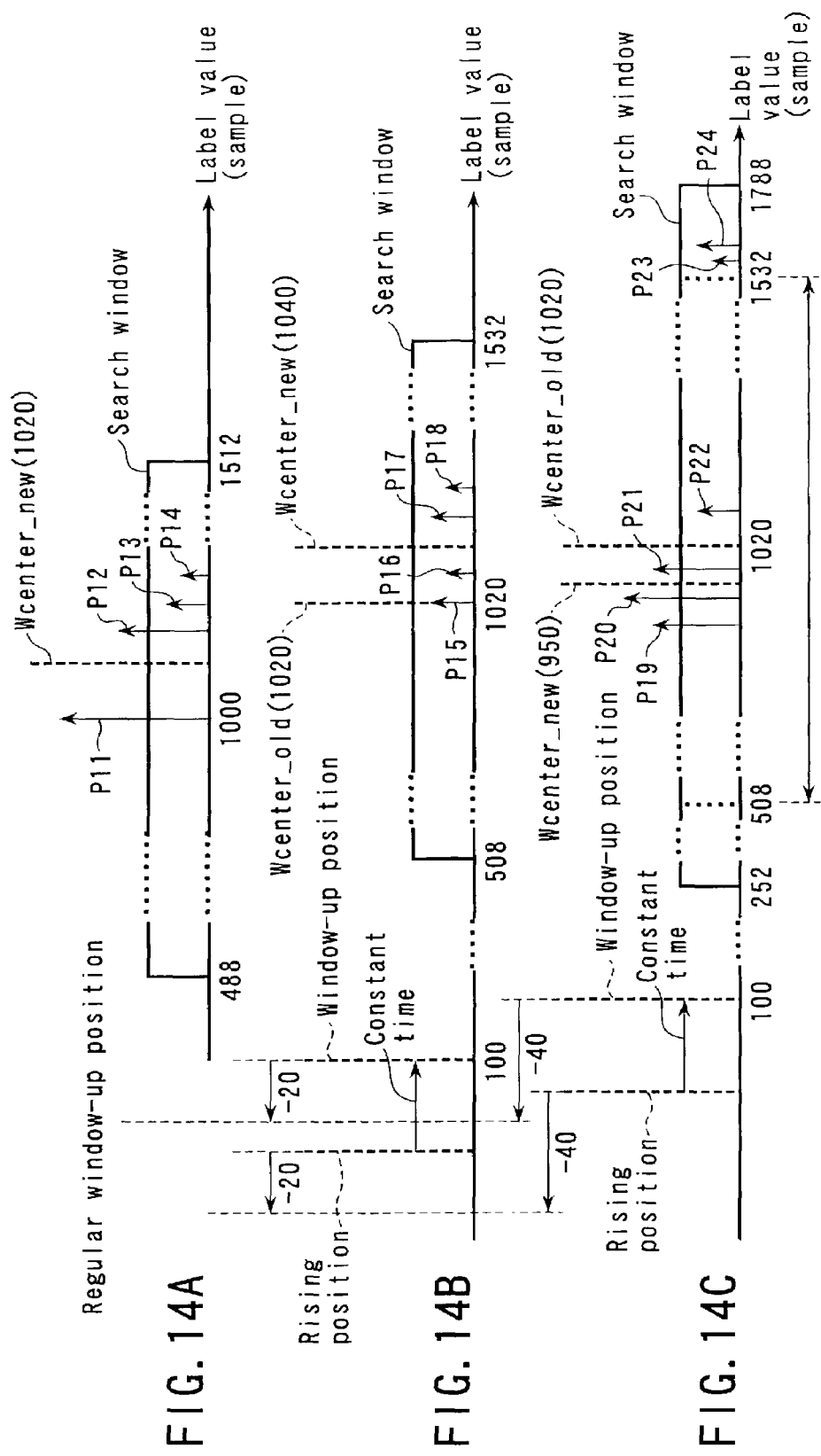

SPREAD SPECTRUM COMMUNICATION APPARATUS AND METHOD OF CONTROLLING THE SAME

CROSS-REFERENCE TO RELATED APPLICATIONS

This application is based upon and claims the benefit of priority from the prior Japanese Patent Application No. 2002-196951, filed Jul. 5, 2002, the entire contents of which are incorporated herein by reference.

BACKGROUND OF THE INVENTION

1. Field of the Invention

The present invention relates to a spread spectrum communication apparatus to be used in a communication system which carries out radio communication with a base station by a spread spectrum communication method and to which incoming information is sent from the base station at a known timing during waiting, and to a of controlling method the spread spectrum communication apparatus.

2. Description of the Related Art

In a mobile communication terminal to be used in a mobile communication system, discontinuous receiving for battery saving has been widely carried out.

The discontinuous receiving may be in an operating state in which incoming information can be normally received at a timing when there is the possibility that incoming information intended for that apparatus will come. The periods except for the operating periods therefor are sleeping periods. In the sleeping period, operation except for that of one part of the circuits is stopped. It can be considered that monitoring of a timing of rising from the sleeping period is carried out by clocking based on a clock signal.

The mobile communication terminal generally uses a high-speed and high-accuracy clock signal for a precise synchronization for communication. When such a clock signal is used, the rising timing can be high accurately monitored. However, in a high-speed oscillator which oscillates the high-speed and high-accuracy clock signal, the electric power consumption is high.

Therefore, a low-speed oscillator which is low-speed and has low-accuracy, as compared with the high-speed oscillator, is provided. Monitoring of the rising timing is carried out on the basis of a low-speed and low-accuracy clock signal to be oscillated by the low-speed oscillator. Further, it is desirable to attempt a further decrease in electric power consumption by stopping the operation of the high-speed oscillator during the sleeping period.

However, when a low-speed and low-accuracy clock signal is used for clocking of the sleeping period, offset will occur in the determination of the rising timing. Further, when the rising timing is offset, there is the fear that the incoming information will fail to be received.

BRIEF SUMMARY OF THE INVENTION

An object of the present invention is to enable rising from sleeping at a timing appropriate for receiving incoming information, even when measuring of the sleeping period is carried out by mainly using a low-speed and low-accuracy clock signal.

According to one aspect of the present invention, there is provided a spread spectrum communication apparatus which carries out radio communication by a spread spectrum communication method with base stations each belonging to any of a plurality of cells, and which is used in a communication system in which incoming information is sent from the base station at a known timing during waiting, the apparatus comprising: a receiving section configured to receive the incoming information; a detecting section configured to detect timings and energies of a plurality of paths relating to a transmitted signal from the base station belonging to a cell which is waiting; a control section configured to control the receiving section and the detecting section so as to operate discontinuously before and after a predetermined sleeping period to be determined so as to avoid a coming timing of the incoming information; a determining section configured to determine a center of gravity in a distribution of the timings of the plurality of paths on the basis of the timings and energies of the respective paths detected by the detecting section; a first deciding section configured to decide a correction timing, within a range in which a timing difference between the correction timing and a timing of a center of gravity determined in a one-before operating period by the determining section does not exceed a predetermined lower limit time and an upper limit time, on the basis of the timing of the center of gravity determined in the one-before operating period by the determining section and a timing of the center of gravity determined in a last operating period by the determining section; a second deciding section configured to decide a correction value on the basis of the correction timing decided by the first deciding section within the last operating period, the correction timing decided by the first deciding section within the one-before operating period, and the correction value determined within the one-before operating period; a first generating section configured to generate a first clock signal having a predetermined frequency; a second generating section configured to generate a second clock signal having a predetermined frequency lower than the first clock signal; a first clocking section configured to clock by counting the first clock signal within a first period which is part of the sleeping period; a second clocking section configured to clock by counting the second clock signal within a second period which is a period of the sleeping period excluding the first period; and a third deciding section configured to decide, on the basis of the correction value, a first count number which the first clocking section counts in order to clock the first period and a second count number which the second clocking section counts in order to clock the second period, wherein the control section makes points in time, when the first clocking section and the second clocking section finish clocking the first period and the second period, respectively, be ending timings of the sleeping period.

According to another aspect of the present invention, there is provided a method of controlling a spread spectrum communication apparatus which carries out radio communication by a spread spectrum communication method with base stations each belonging to any of a plurality of cells, the apparatus comprising: a receiving section configured to receive incoming information sent from the base station at known timing during waiting; a first generating section configured to generate a first clock signal having a predetermined frequency; and a second generating section configured to generate a second clock signal having a predetermined frequency lower than the first clock signal, the controlling method comprising: detecting timings and energies of a plurality of paths relating to a transmitted signal from the base station belonging to a cell which is waiting; discontinuously carrying out operation of the receiving section and detection of the timings and energies of the plurality of paths before and after a predetermined sleeping period determined so as to avoid a coming timing of the incoming information; determining a center of gravity in a distribution of the timings of the plurality of paths on the basis of the timings and energies of the respective detected paths; deciding a correction timing, within a range in which a timing difference between the correction timing and a timing of the center of gravity determined in a one-before operating period does not exceed a predetermined lower limit time and an upper limit time, on the basis of the timing of the center of gravity determined in the one-before operating period and a timing of the center of gravity determined in a last operating period; deciding a correction value on the basis of the correction timing decided in the last operating period, the correction timing decided in the one-before operating period, and the correction value decided in the one-before operating period; clocking a first clocking period, which is part of the sleeping period, by counting the first clock signals; clocking a second period, which is a period in the sleeping period excluding the first period, by counting the second clock signals; and deciding a count number, which the first clocking section counts in order to clock the first period, and a count number, which the second clocking section counts in order to clock the second period, on the basis of the correction value, wherein points in time when the first clocking section and the second clocking section respectively finish clocking the first period and the second period are made to be ending timings of the sleeping period.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiment of the invention, and together with the general description given above and the detailed description of the embodiment given below, serve to explain the principles of the invention.

FIGS. 10A and 10B are diagrams showing states of changes of the center of gravity of the multipath;

FIGS. 11A and 11B are diagrams showing states of changes of the center of gravity of the multipath;

FIGS. 12A and 12B are diagrams showing states of changes of the center of gravity of the multipath;

FIG. 13 is a table showing one example of agreements relating to the width of a search window; and FIGS. 14A to 14C are diagrams showing concrete examples of states in which the width of the window is changed.

DETAILED DESCRIPTION OF THE INVENTION

Hereinafter, an embodiment of the present invention will be described with reference to the drawings.

Figure 1:
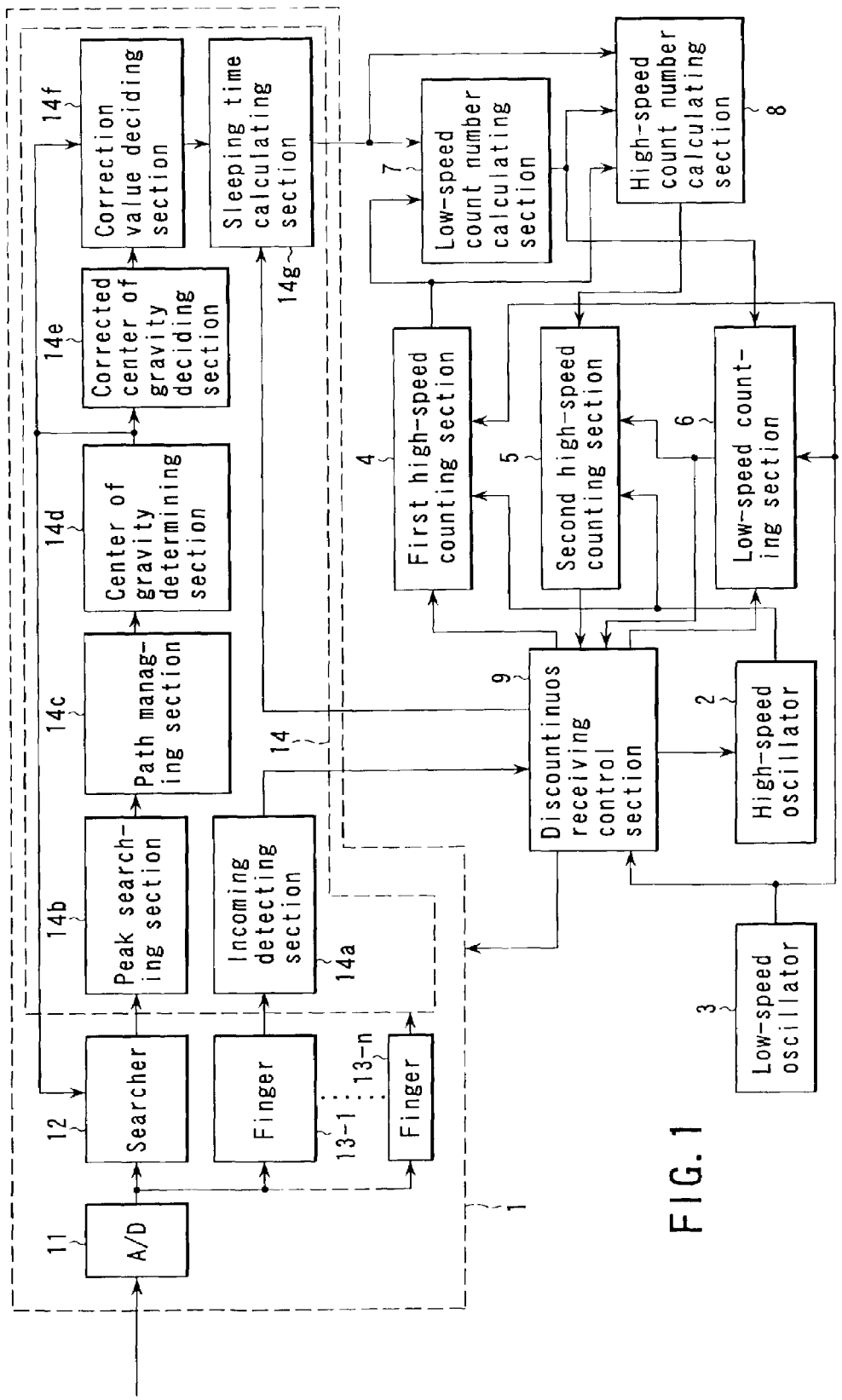
FIG. 1 is a block diagram of a mobile communication terminal according to an embodiment of the present invention.

FIG. 1 is a block diagram of a mobile communication terminal according to the present embodiment. Note that, FIG. 1 mainly shows a structure relating to discontinuous receiving. The structure of the portion omitted from FIG. 1 is similar to that of a well-known mobile communication terminal. In the present embodiment, the mobile communication terminal conforms to the standards of 3GPP (3rd Generation Partnership Project).

As shown in FIG. 1, the mobile communication terminal of the present embodiment comprising a modem section 1, a high-speed oscillator 2, a low-speed oscillator 3, a first high-speed counting section 4, a second high-speed counting section 5, a low-speed counting section 6, a low-speed count number calculating section 7, a high-speed count number calculating section 8, and an discontinuous receiving control section 9. The modem section 1 further comprising an A/D converter 11, a searcher 12, n fingers 13-1 to 13-n, and a DSP (Digital Signal Processor) 14.

A radio frequency signal transmitted from a base station (not shown) is received at a radio section (not shown). The received signal of the base band obtained as the result of the receiving processing at the radio section is inputted to the A/D converter 11.

The A/D converter 11 samples the received signal given as described above at a predetermined sampling rate. At this time, the sampling rate is set, for example, to an integral multiple of a chip rate of a PN (Pseudo Noise) code.

The received signals sampled at the A/D converter 11 are respectively inputted to the searcher 12 and the fingers 13-1 to 13-n.

The searcher 12 multiplies a spread code, which is made to correspond to a cell to be searched (active cell), by the received signal at various types of timings, and despreads. The searcher 12 determines a range of despread timings around the center of gravity position notified from the DSP 14. An electric power value obtained by the results of the despread shows a height of correlation at the respective despread timings. The searcher 12 gives such an electric power value along with information showing the respective despread timings to the DSP 14.

The fingers 13-1 to 13-n respectively despread the received signals by using a PN code of a phase designated by a receiving control section (not shown). The fingers 13-1 to 13-n respectively give the despreaded signals to the DSP 14.

The DSP 14 carries out various types of digital processings by using the information given from the searcher 12 and the fingers 13-1 to 13-n. The DSP 14 can change the operating state thereof in accordance with the operating state of the mobile communication terminal. Further, in an discontinuous receiving state, the DSP 14 functions as the structure shown in FIG. 1.

Namely, in the discontinuous receiving state, the DSP 14 respectively achieves functions as an incoming detecting section 14a, a peak searching section 14b, a path managing section 14c, a center of gravity determining section 14d, a corrected center of gravity deciding section 14e, a correction value deciding section 14f, and a sleeping time calculating section 14g.

The incoming detecting section 14a reproduces received data by carrying out a predetermined processing on the signal despreaded by the finger 13-1. Further, the incoming detecting section 14a detects incoming by detecting incoming information addressed to itself which is included in the received data. The incoming detecting section 14a gives the results of the incoming detection to the discontinuous receiving control section 9.

The peak searching section 14b detects up to m electric power values from the largest of the electric power values which are a predetermined threshold value or more, from among the electric power values given from the searcher 12. An despread timing corresponding to the electric power values detected here is an despread timing relating to a path useful for receiving information. Namely, the peak searching section 14b detects the timings and the electric power values of a plurality of paths relating to an active cell. The peak searching section 14b generates respective candidate path information which show the electric power value and information showing the timing in association with each other, for each path, and outputs the information to the path managing section 14c.

The path managing section 14c stores the candidate path information.

The center of gravity determining section 14d determines a center of gravity in the distribution of the detected timings of the plurality of paths on the basis of the candidate path information stored in the path managing section 14c. The center of gravity determining section 14d gives the determined center of gravity to the searcher 12, the corrected center of gravity deciding section 14e, and the correction value deciding section 14f.

The corrected center of gravity deciding section 14e decides a corrected center of gravity, which will be described later, on the basis of a new center of gravity and an old center of gravity. Note that the new center of gravity is a center of gravity determined by the center of gravity determining section 14d within the last operating period during discontinuous receiving. The old center of gravity is a center of gravity determined by the center of gravity determining section 14d within the operating period which is one before the last operating period. The corrected center of gravity deciding section 14e gives the decided corrected center of gravity to the correction value deciding section 14f.

The correction value deciding section 14f decides a new correction value on the basis of the old center of gravity, the corrected center of gravity, and the old correction value. Assuming that the corrected center of gravity used here is determined by the corrected center of gravity deciding section 14e within the last operating period. The old correction value is a correction value decided by itself within the operating period which is one before the last operating period. The correction value deciding section 14f gives the decided new correction value to the sleeping time calculating section 14g.

A starting time and an ending time of the next sleeping period are notified from the discontinuous receiving control section 9 to the sleeping time calculating section 14g. The sleeping time calculating section 14g calculates the sleeping time showing the length of the next sleeping period on the basis of the starting time, the ending time and the new correction value. The sleeping time calculating section 14g gives the calculated sleeping time to the low-speed count number calculating section 7 and the high-speed count number calculating section 8.

The modem section 1 can switch between the operating state and the sleeping state in accordance with a control signal given from the discontinuous control section 9. In the operating state, the respective sections normally carry out the functions as described above. In the sleeping state, the respective sections stop the operations.

The high-speed oscillator 2 oscillates a high-speed clock of a high rate reaching an integer multiple of a chip rate. Note that, in the present embodiment, the rate of the high-speed clock is 15.36 MHz which is four times the chip rate of 3.84 MHz. A high-accuracy oscillator such as, for example, a voltage-controlled/temperature controlled crystal oscillator (VCTCXO) is applied as the high-speed oscillator 2. The high-speed clock which is oscillated by the high-speed oscillator 2 is respectively given to the first high-speed counting section 4 and the second high-speed counting section 5.

The low-speed oscillator 3 oscillates a low-speed clock of a low rate as compared with the high-speed clock. The low-speed clock is, for example, about 32 KHz. A crystal oscillator which does not have a function for controlling the oscillated frequency is applied as the low-speed oscillator 3. The low-speed clock which is oscillated by the low-speed oscillator 3 is given to the first high-speed counting section 4 and the low-speed counting section 6.

A starting notification is given to the first high-speed counting section 4 from the discontinuous receiving control section 9 at the starting timing of the sleeping period. The first high-speed counting section 4 starts to count the high-speed clock in accordance with receiving the starting notification. The first high-speed counting section 4 stops counting in accordance with the first rising of the low-speed clock after the start of counting. The first high-speed counting section 4 gives the counted value to the low-speed count number calculating section 7 and the high-speed count number calculating section 8.

A counting-up notification is given to the second high-speed counting section 5 from the low speed counting section 6. The second high-speed counting section 5 starts to count the high speed clock in accordance with receiving the counting-up notification. The second high-speed counting section 5 gives the counting-up notification to the discontinuous receiving control section 9 in accordance with the ending of the counting of the high speed count number given from the high-speed count number calculating section 8.

A starting notification is given to the low-speed counting section 6 from the discontinuous receiving control section 9 at the starting timing of the sleeping period. The low-speed counting section 6 starts to count the low-speed clock in accordance with receiving the starting notification. The low-speed counting section 6 gives a counting-up notification to the second high-speed counting section 5 in accordance with the ending of the counting of the low-speed count number given from the low-speed count number calculating section 7.

The counted value at the first high-speed counting section 4 is given to the low-speed count number calculating section 7. The low-speed count number calculating section 7 calculates the low-speed count number on the basis of the counted value and the sleeping time. The low-speed count number calculating section 7 gives the calculated low-speed count number to the high-speed count number calculating section 8 and the low-speed counting section 6.

The counted value at the first high-speed counting section 4 is given to the high-speed count number calculating section 8. The high-speed count number calculating section 8 calculates the high-speed count number on the basis of the counted value, the sleeping time, and the low-speed counted value. The high-speed count number calculating section 8 gives the calculated high-speed count number to the second high-speed counting section 5.

When incoming is not detected by the incoming detecting section 14a, the discontinuous receiving control section 9 determines a starting time and an ending time of the next sleeping period, and notifies the sleeping time calculating section 14g of them. When the starting time has come, the discontinuous receiving control section 9 gives a starting notification to the first high-speed counting section 4 and the low-speed counting section 6, and gives the modem section 1 a control signal for designating a switch to the sleeping state. The discontinuous receiving control section 9 stops the operation of the high-speed oscillator 2 in accordance with the first rising of the low-speed clock after the starting time has been reached. The discontinuous receiving control section 9 activates the high-speed oscillator 2 in accordance with being given the counting-up notification from the low-speed counting section 6. The discontinuous receiving control section 9 gives the modem section 1 a control signal for designating a switch to the operating state, in accordance with being given the counting-up notification from the second high-speed counting section 5.

The operation of the mobile communication terminal structured as described above will be described.

When rising from a sleeping state, a plurality of paths are detected as is known well by the searcher 12 and the peak searching section 14b. Further, the candidate path information, which respectively show the electric power value and the information showing timings in association with each other for the respective paths, are stored in the path managing section 14c.

The center of gravity determining section 14d determines a center of gravity in the distribution of the timings of the detected plurality of paths on the basis of the candidate path information by the following equation.

Center of gravity=$T1+\Sigma\{(Tn-T1)\times Pn\}/\Sigma Pn$

Figures 2, 4:
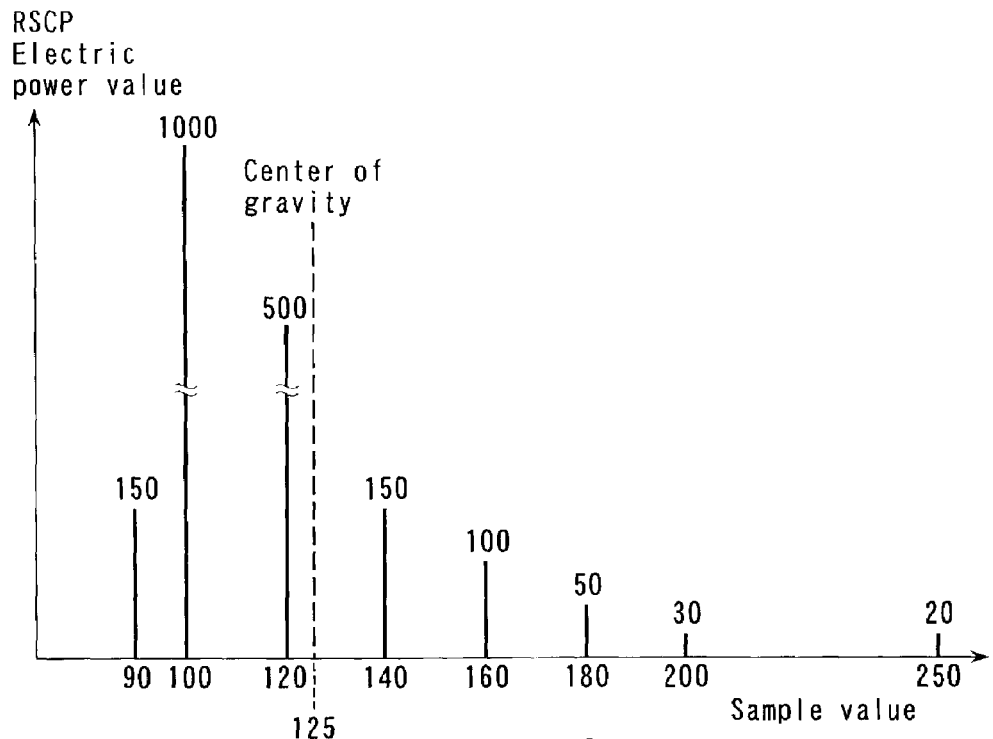
FIG. 2 is a graph showing one example of a center of gravity of a multipath.
FIG. 4 is a table showing an example of various types of parameters.

T1=principal wave position
Tn=path position in search window
Pn=electric power value of each path Concretely, it is assumed that the paths shown in the candidate path information are distributed as shown in FIG. 2. The center of gravity of this case is determined as follows.

100+{(90−100)×150+(120−100)×500+(140−100)×150+(160−100)×100+(180−100)×50+(200−100)×30+(250−100)×20}/(150+1000+500+150+100+50+30+20)=100+{−1500+10000+3000+4000+4000+3000+3000}/2000=100+25500/1000=125.5

Figure 3:
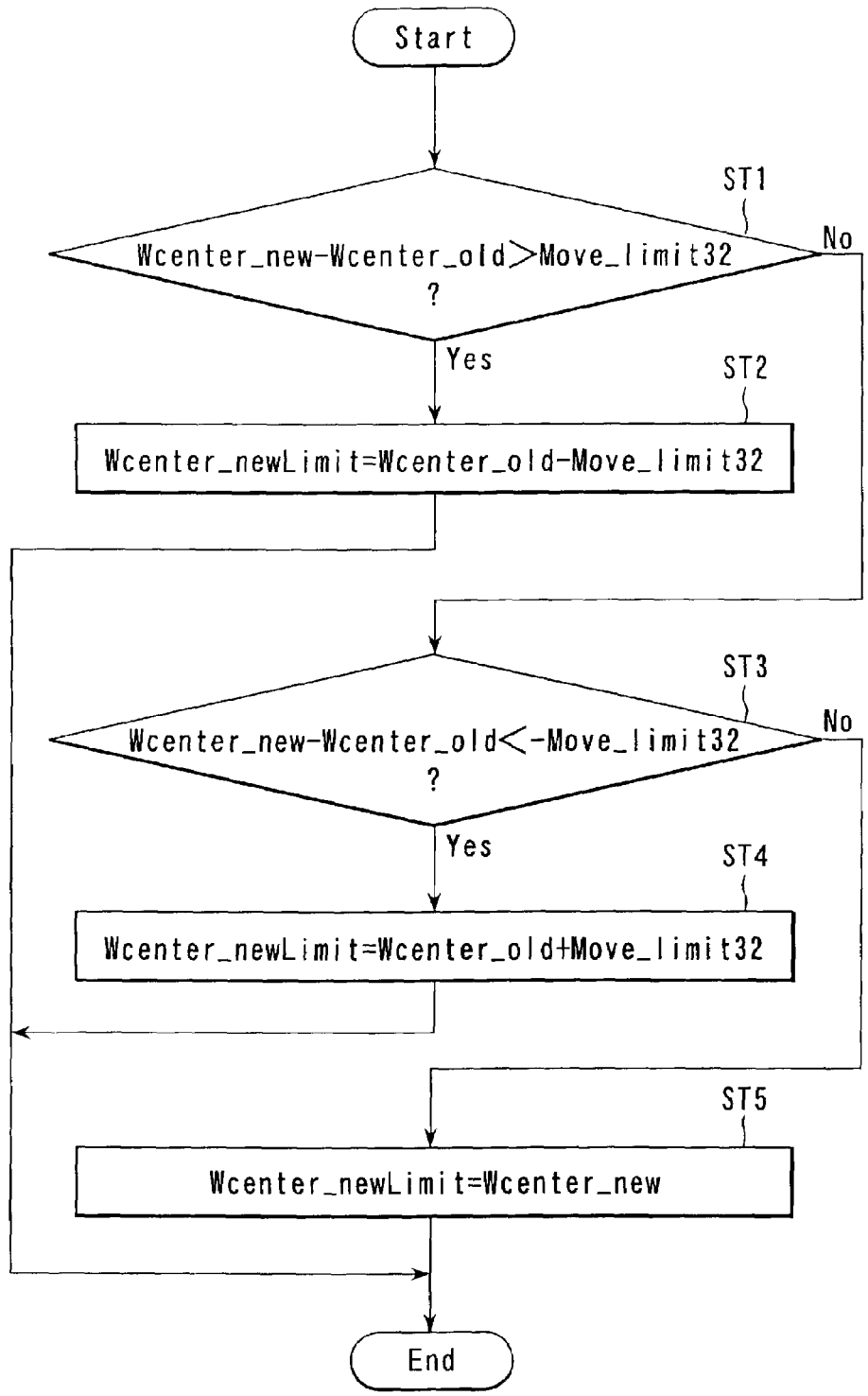
FIG. 3 is a flowchart for deciding a corrected center of gravity.

When the center of gravity determined in this way is received from the center of gravity determining section 14d, the corrected center of gravity deciding section 14e determines a corrected center of gravity by the processing shown in FIG. 3. Note that, here, the corrected center of gravity is denoted by Wcenter_newLimit, the new center of gravity is denoted by Wcenter_new, the old center of gravity is denoted by Wcenter_old, and a corrected upper limit value is denoted by Move_limit32. Further, all of the units of these values are "sample".

In step ST1, the corrected center of gravity deciding section 14e confirms whether or not the relationship which is Wcenter_new−Wcenter_old>Move_limit32 is established. When the center of gravity increases from Wcenter_old to Wcenter_new to over Move_limit32, the corrected center of gravity deciding section 14e determines YES in step ST1. In this case, the corrected center of gravity deciding section 14e decides Wcenter_newLimit to be a value which is obtained by Wcenter_old−Move_limit32 in step ST2.

When it is determined NO in step ST1, the corrected center of gravity deciding section 14e confirms whether or not the relationship which is Wcenter_new−Wcenter_old<−Move_limit32 is established. When the center of gravity decreases from Wcenter_old to Wcenter_new to under Move_limit32, the corrected center of gravity deciding section 14e determines YES in step ST3. In this case, the corrected center of gravity deciding section 14e decides Wcenter_newLimit to be a value which is obtained by Wcenter_old+Move_limit32 in step ST4.

When the fluctuated amount from Wcenter_old to Wcenter_new does not exceed Move_limit32, the corrected center of gravity deciding section 14e determines NO in step ST3 as well. In this case, the corrected center of gravity deciding section 14e determines Wcenter_new as Wcenter_newLimit as is in step ST5.

In this way, if the fluctuated amount from the old center of gravity Wcenter_old to the new center of gravity Wcenter_new does not exceed the corrected upper limit value Move_limit32, the corrected center of gravity deciding section 14e uses the new center of gravity Wcenter_new as is as the corrected center of gravity Wcenter_newLimit. However, if the fluctuated amount from the old center of gravity Wcenter_old to the new center of gravity Wcenter_new exceeds the corrected upper limit value Move_limit32, the corrected center of gravity deciding section 14e limits the corrected center of gravity Wcenter_newLimit to a value obtained by Wcenter_old±Move_limit32.

The corrected upper limit value Move_limit32 is determined as follows in consideration of the characteristics of the low-speed oscillator 3.

First, various types of parameters of the present mobile communication terminal are assumed as shown in FIG. 4.

(1) Assuming that the low-speed oscillator 3 steadily has an accuracy of about 10 ppm/s. At this time, the frequency offset of the low-speed clock signal caused by a temperature change or the like is at most about 0.6 ppm/s. The frequency offset corresponds to ±2.3 chips/s. Namely, a frequency offset which can be generated in a low-speed clock is at most ±2.3 chips per one second.

(2) In TS25.101 B.2.2 Multi-path fading Propagation Conditions, CASE2 of 3GPP, it is described as a necessary condition that there is a function capable of acquiring a path at a position set apart by at most 20 μseconds. 20 μseconds corresponds to 77 chips. Accordingly, a corresponding range of spreading of the multipath is ±77 chips.

(3) The deviation of the high-speed clock signal caused by the accuracy of the high-speed oscillator 2, and the phase shift between the high-speed clock signal and the base station clock signal by Doppler frequency are extremely small even in a case where it is assumed that it is moving at 120 km per hour, as known from the following equation.

$$(120\times 10^3/3600)/(3\times 10^8)\times 5.12 = 0.5632 \text{ (ppm)}$$

Therefore, it can be considered that the phase shift is within about ±1 chip.

(4) The width of a search window which is steadily necessary is determined by the sum of (2) and (3), and is ±78 chips.

(5) The width of a standard search window is set to ±128 chips.

(6) The difference between (5) and (4) is a margin which can absorb the deviation of the low-speed clock signal. Here, the margin is ±50 chips.

Figures 5, 6, 7:
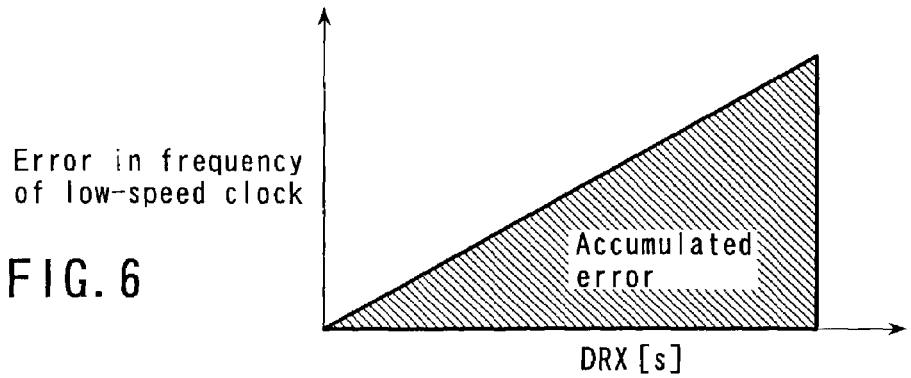
FIG. 5 is a table showing maximum values of frequency offsets of low-speed clock signals.
FIG. 6 is a graph showing a maximum value of a phase shift of an discontinuous receiving period.
FIG. 7 is a table showing maximum values of phase shifts of a DRX.

As described above, from (1), the maximum value of the frequency offset of the low-speed clock signal each time an discontinuous receiving period (DRX) elapses is determined by the following equation. Further, the concrete value is as shown in FIG. 5.

$$2.3 \times (\text{number of elapsed DRX}) \times (\text{time of 1 DRX})$$

For example, if 1 DRX is set to 2.56 seconds, the maximum value of the frequency offset of the low-speed clock signal after 1 DRX elapses is determined to be 5.888 chips by the following equation.

$$2.3 \times 1 \times 2.56 = 5.888$$

When clocking based on the low-speed clock signal in which such a frequency offset occurs is carried out, the frequency offsets of the low-speed clock signal are accumulated and appear in the offset arising in the clocked time. Therefore, the maximum value of the phase shift of DRX when DRX is clocked on the basis of only the low-speed clock signal is a value corresponding to an area of the triangle shown by hatching in FIG. 6. Note that FIG. 6 is a graph showing changes over time of the error in the low-speed clock frequency. Therefore, the maximum value of the phase shift of DRX each time DRX elapses is determined by the following formula. Further, the concrete value is a value as shown in FIG. 7.

$$(\text{Frequency offset after the same number of DRX elapses}) \times (\text{time of 1 DRX})/2$$

For example, if 1 DRX is set to 2.56 seconds, the maximum value of the phase shift of DRX after 1 DRX has elapsed is determined to be 7.53664 chips by the following equation.

$$5.888 \times 2.56/2 = 7.53664$$

Assuming that the corrected upper limit value Move_limit32 is a value in which the maximum value of the phase shift of DRX after 1 DRX has elapsed is converted to a sample value and the numbers at the right of the decimal point thereof are rounded off.

The corrected upper limit value Move_limit32 when 1 DRX is 0.64 seconds is determined to be 2 samples by rounding off the numbers at the right of the decimal point of a value determined by the following equation.

$$0.47104 \times 4 = 1.88416$$

The corrected upper limit value Move_limit32 when 1 DRX is 1.28 seconds is determined to be 8 samples by rounding off the numbers at the right of the decimal point of a value determined by the following equation.

$$1.88416 \times 4 = 7.53664$$

The corrected upper limit value Move_limit32 when 1 DRX is 2.56 seconds is determined to be 30 samples by rounding off the numbers at the right of the decimal point of a value determined by the following equation.

$$7.53664 \times 4 = 30.14656$$

When the corrected center of gravity Wcenter_newLimit determined as described above is received from the corrected center of gravity deciding section 14e, the correction value deciding section 14f decides a correction value Adjust32new by the following equation. Note that Adjust32old is the value which the correction value deciding section 14f decided as Adjust32new in the operating period which is one before the last operating period. Adjust32old is set to "0" at the time when an discontinuous receiving state newly arises.

$$\text{Adjust32new} = \text{Adjust32old} + \text{Wcenter\_newLimit} - \text{Wcenter\_old}$$

Namely, the correction value deciding section 14f determines a value, in which the offset amount of the timing between the corrected center of gravity Wcenter_newLimit and the old center of gravity Wcenter_old is accumulated, as the correction value Adjust32new.

When incoming addressed to oneself is not detected at the incoming detecting section 14a at the time of this receiving operation, the discontinuous receiving control section 9 decides a starting time of the next sleeping period. Further, the discontinuous receiving control section 9 decides an ending time of the sleeping period from the timing when incoming information addressed to oneself will come next. Further, the starting time and ending time are notified to the sleeping time calculating section 14g.

When the starting time and the ending time are notified from the discontinuous receiving control section 9, the sleeping time calculating section 14g calculates the time (sleeping time) of the next sleeping period by the following formula.

$$(\text{Time difference (seconds) between starting time and ending time}) \times 15.36M + \text{Adjust32new}$$

Namely, the sleeping time calculating section 14g calculates the sleeping time as a frequency of the high-speed clock signal contained within the time. Further, a value, which is corrected by adding the correction value Adjust32new to the original sleeping time corresponding to the time difference between the starting time and the ending time, is the next sleeping time. Note that the sleeping time calculating section 14g rounds down the numbers at the right of the decimal point of the value obtained by the above-described formula. Namely, the sleeping time is an integer value.

When the sleeping time calculated in this way is given from the sleeping time calculating section 14g, the low-speed count number calculating section 7 and the high-speed count number calculating section 8 take-in the sleeping time and hold it.

Figure 8:
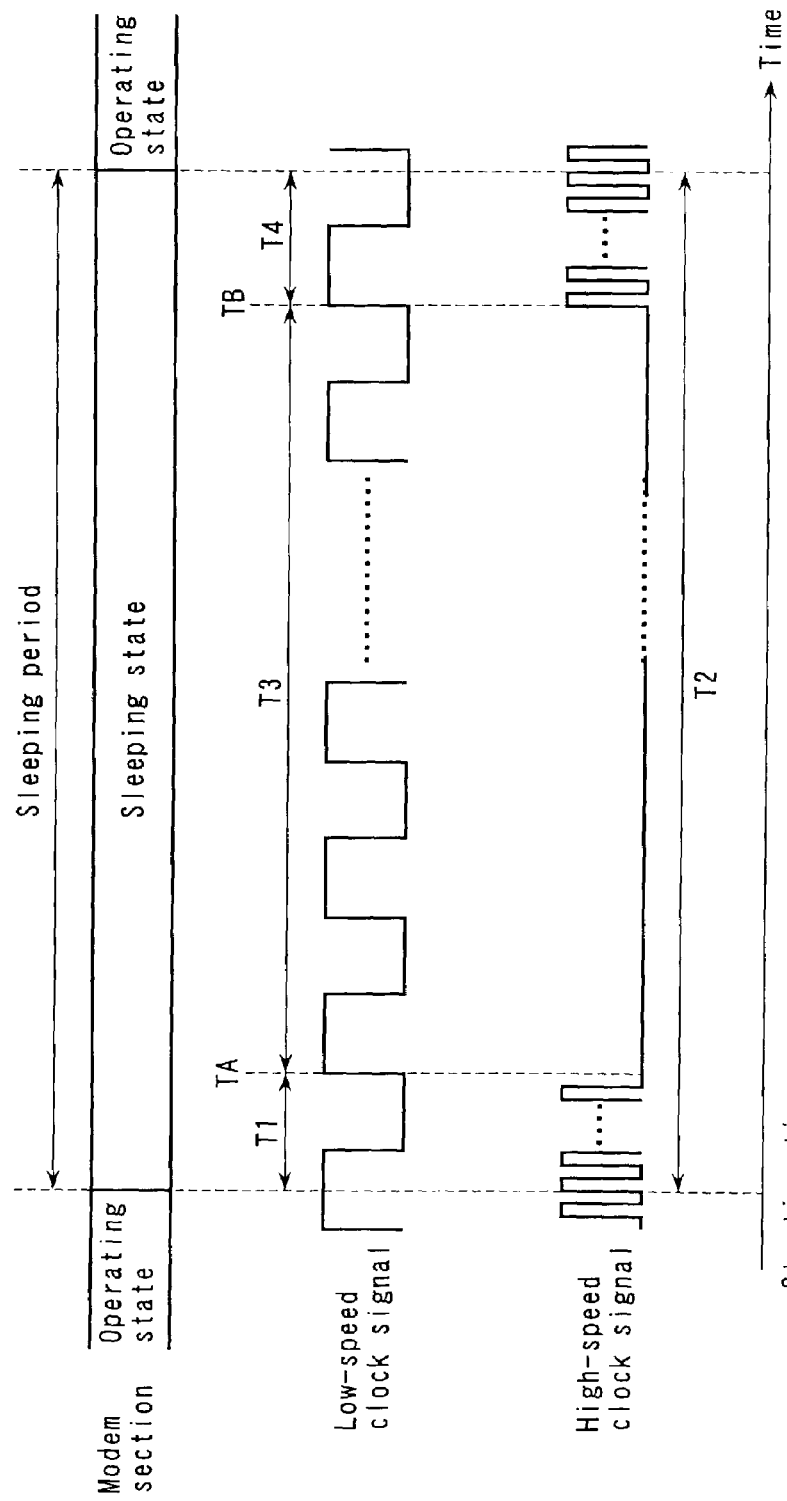
FIG. 8 is a diagram showing details of counting operation.

On the other hand, when the starting time has come, the discontinuous receiving control section 9 gives the modem section 1 a control signal for instructing switching to the sleeping state. Further, the discontinuous receiving control section 9 gives a starting notification to the first high-speed counting section 4. In this way, as shown in FIG. 8, the modem section 1 is set in a sleeping state, and the sleeping period starts. Further, clocking of the elapsed time from the start of the sleeping period is started by the first high-speed counting section 4. Note that the first high-speed counting section 4 only carries out simple counting operation in synchronization with the high-speed clock signal. Accordingly, the elapsed time clocked by the second high-speed counting section 4 is expressed as a frequency of the high-speed clock signal.

The first high-speed counting section 4 carries out clocking during the time until the low-speed clock signal rises. Accordingly, the first high-speed counting section 4 clocks time T1 in FIG. 8. The first high-speed counting section 4 gives the time T1 clocked in this way to the low-speed count number calculating section 7 and the high-speed count number calculating section 8.

When the time T1 is given from the first high-speed counting section 4, the high-speed count number calculating section 8 takes-in the time T1 and holds it.

When the time T1 is given from the first high-speed counting section 4, the low-speed count number calculating section 7 makes a value, in which the numbers at the right of the decimal point of the value determined by the following formula are rounded down, be the low-speed count number.

$$(T2-T1)/f1$$

T2=sleeping time
f1=frequency of low-speed clock signal

As shown in FIG. 8, due to the low-speed clock first rising after starting of sleeping period, clocking based on the low-speed clock can be carried out. Further, until that time, the time T1 already elapses. Thus, the low-speed count number calculating section 7 calculates the low-speed count number as the number of periods of the low-speed clock signal which can be included in the remaining time of the sleeping time T2.

Note that, a value estimated by calibration which is carried out at the time of start-up of the power source of the present mobile communication terminal is used as the frequency f1.

The calibration is carried out as described below.

Assuming that the nominal frequency of the high-speed clock signal is 15.36 MHz (1 clock period is 65.10 ns), the nominal frequency of the low-speed clock signal is 32.768 MHz (1 clock period is 30.52 us), and the measuring time is 2.56 seconds.

Under these conditions, the measuring time is a period for 83886.08 low-speed clock signals or for 39321600 high-speed clock signals. However, if 40000000 high-speed clock signals are counted during the time that 83886 low-speed clock signals are counted, the frequency of the low-speed clock signal is estimated to be about 32.22 KHz by the following equation.

$$1 \text{ cycle } N=40000000/83886=476.84 \text{ (clock period)}$$

$$\text{Period } T=476.84 \times 65.10 \text{ ns}=31.04 \text{ μs}$$

$$f1=1/T=1/(31.04 \times 10^{-6})=32216.50 \text{ (Hz)}$$

The low-speed count number calculated by the low-speed count number calculating section 7 is loaded to the low-speed counting section 6. The low-speed count number is given from the low-speed count number calculating section 7 to the high-speed count number calculating section 8. When the low-speed count number is given from the low-speed count number calculating section 7, the high-speed count number calculating section 8 determines a value, in which the numbers at the right of the decimal point of the value determined by the following equation are rounded off, to be the high-speed count number.

$$T2-T1-T3 \times fh/f1$$

T3=low-speed count number
fh=frequency of high-speed clock signal

In accordance therewith, the number of periods of the high-speed clock signal contained in a time T4 shown in FIG. 8 is calculated as the high-speed count number. Further, the high-speed count number is loaded to the second high-speed counting section 5.

The discontinuous receiving control section 9 gives a starting notification to the low-speed counting section 6 in accordance with the first rising of the low-speed clock after the sleeping period started. Accordingly, the low-speed counting section 6 starts to count the low-speed clock signals in accordance with receiving the starting notification from the discontinuous receiving control section 9. The low-speed counting section 6 continues to count until counting of the low-speed count number is complete. In this way, the low-speed counting section 6 clocks from point in time TA to point in time TB in FIG. 8. Further, the low-speed counting section 6 finishes counting the low-speed count number at the point in time TB in FIG. 8, and gives a counting-up notification to the second high-speed counting section 5 and the discontinuous receiving control section 9.

In this way, in the period from the point in time TA to the point in time TB, clocking is carried out on the basis of the low-speed clock signal, and the high-speed clock signal is not utilized. Further, after the discontinuous receiving control section 9 gives the starting notification to the low-speed counting section 6 at the point in time TA, the discontinuous receiving control section 9 stops the operation of the high-speed oscillator 2. The discontinuous receiving control section 9 restarts the operation of the high-speed oscillator 2 in accordance with being given the counting-up notification at the point in time TB from the low-speed counting section 6.

In accordance with receiving the counting-up notification from the low-speed counting section 6, the second high-speed counting section 5 starts to count the high-speed clock signals. Namely, the second high-speed counting section 5 starts to count from the point in time TB in FIG. 8. The second high-speed counting section 5 continues to count until counting of the high-speed count number is completed. Further, when time T4 elapses from the point in time TB and counting of the high-speed count number is finished, the second high-speed counting section 5 gives a counting-up notification to the discontinuous receiving control section 9.

When the counting-up notification is received from the second high-speed counting section 5, the discontinuous receiving control section 9 gives the modem section 1 a controlling signal for instructing a switch to the operating state. In accordance therewith, the modem section 1 rises from the sleeping state and is in the operating state. Namely, at the point in time when the second high-speed counting section 5 has counted-up, the sleeping period ends.

In this way, a period (the period from the point in time TA to the point in time TB in FIG. 8) which can be clocked by the low-speed clock signals in the sleeping period is clocked on the basis of the low-speed clock signals. The remaining time in the sleeping period is clocked on the basis of the high-speed clock signal. Further, one or both of these count numbers of the clock signals for carrying out clocking is corrected in accordance with the correction value Adjust32new. Further, in accordance therewith, the timing of rising from the sleeping period is corrected.

Hereinafter, the state of correcting the rising timing will be concretely described.

Figures 9A, 9B, 9C:
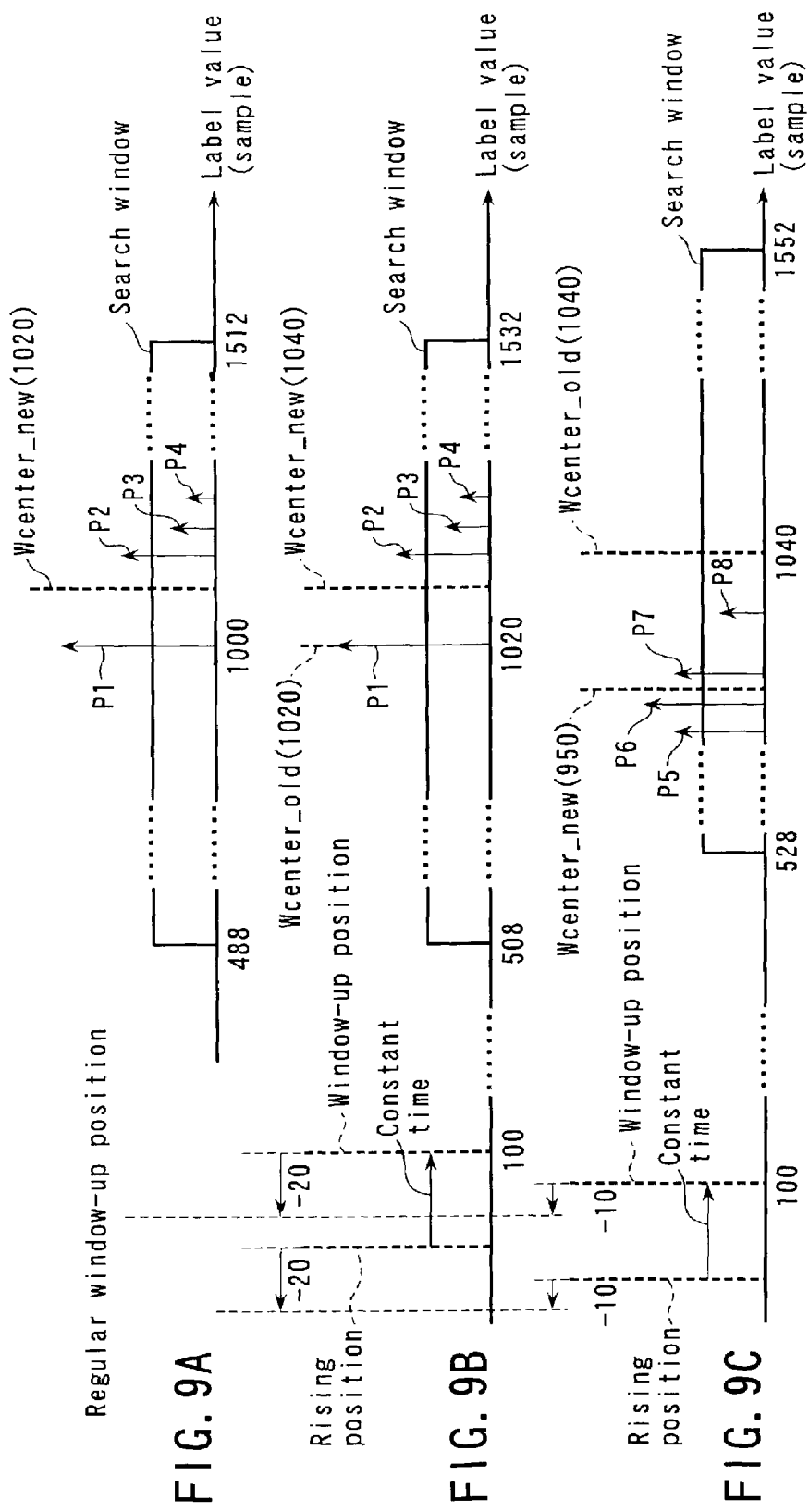
FIGS. 9A to 9C are diagrams showing concrete examples of states in which a timing of rising is corrected.

At the time of opening a PCH (Paging Channel), firstly, for example, as shown in FIG. 9A, the center of gravity position in the most recent multipath state is determined. In FIG. 9A, paths P1 to P4 have been detected, and the center of gravity position Wcenter_new is determined to be 1020 samples.

Next, when it rises from the sleeping period, as shown in FIG. 9B, the searcher 12 makes a timing, at which a constant time has elapsed from this timing (hereinafter called a rising position), be a window-up position. The searcher 12 sets a label value showing the window-up position to a predetermined value. Although the label value allocated to the window-up position is variable, an example of 100 samples is shown in FIGS. 9A to 9C.

In FIG. 9B, the rising position is offset by −20 samples due to the effect of the frequency offset of the low-speed clock signals. Accordingly, the window-up position is offset by −20 samples.

In FIG. 9B, there is no fluctuation in the path from the time of the previous path searching. However, due to the window-up position being offset, the relationship between the path timing and the label value is offset. The label values of the center of gravity positions of the paths P1 to P4 are 1040 samples.

Note that the searcher 12 sets a range of ±512 samples (±128 chips) around the center of gravity position Wcenter_old determined on the basis of the previous path searching result, as the search window.

At this time, the new center of gravity Wcenter_new is 1040 samples. The old center of gravity Wcenter_old is 1020 samples. Accordingly, a value determined by Wcenter_new−Wcenter_old is 20 samples. If 1 DRX is set to 2.56 seconds, the corrected upper limit value Move_limit32 is 30 samples, and a value determined by Wcenter_new−Wcenter_old is less than the corrected upper limit value Move_limit32. Further, as the corrected center of gravity Wcenter_newLimit, the new center of gravity Wcenter_new is used as is, and is determined to be 1040 samples. Moreover, the correction value Adjust32new is determined to be 20 samples by the following equation.

Adjust32new=0+1040−1020=20

Note that, in this equation, because a correction value was not determined at the last time, the correction value Adjust32old is 0 samples.

Further, in the next sleeping period, in order to carry out counting of 20 samples more, one or both of the count number of the low-speed clock signals and the count number of the high-speed clock signals are corrected. Accordingly, the next rising position is corrected by the offset amount of the previous rising position.

In FIG. 9C, the rising position is offset by −10 samples due to the effect of the frequency offset of the low-speed clock signals. Accordingly, the window-up position is offset by −10 samples. Moreover, in FIG. 9C, path fluctuation occurs. Further, in FIG. 9A, paths P5 to P8 are detected.

At this time, the new center of gravity Wcenter_new is 950 samples. The old center of gravity Wcenter_old is 1040 samples. Accordingly, a value determined by Wcenter_new−Wcenter_old is 90 samples. If 1 DRX is set to 2.56 seconds, the corrected upper limit value Move_limit32 is 30 samples, and the value determined by Wcenter_new−Wcenter_old is more than the corrected upper limit value Move_limit32. Therefore, the corrected center of gravity Wcenter_newLimit is determined to be 980 samples by the following equation.

Wcenter_newLimit=Wcenter_old+Move_limit32=950−30=920

Moreover, the correction value Adjust32new is determined to be −10 samples by the following equation.

Adjust32new=20+920−950=−10

Further, in the next sleeping period, in order to carry out counting of 10 samples less, one or both of the count number of the low-speed clock signals and the count number of the high-speed clock signals are corrected.

In this way, when both of fluctuation in the frequency of the low-speed clock signals and fluctuation in the path occur, or when only fluctuation in the path occurs, correction of the count number within the sleeping period is carried out by a correction value which does not correspond to the amount of the fluctuation in the frequency of the low-speed clock signals. Further, as a result, the offset of the rising position caused by the fluctuation in the frequency of the low-speed clock signals is not correctly corrected at each individual sleeping period. However, instantaneous fluctuations in the multipath are considerably severe, and from a long-term standpoint, it is known that the fluctuations in the multipath remain at the same timing. Accordingly, from a long-term standpoint, effects of the fluctuations in the multipath do not appear, and it can be considered that the rising position is corrected by compensating for the fluctuations in the frequency of the low-speed clock signals.

Figure 10B:
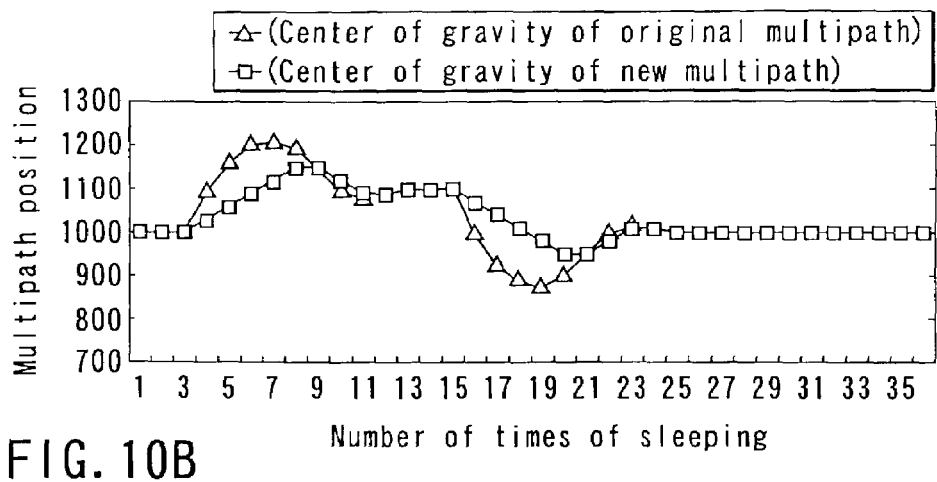

FIGS. 10A and 10B are diagrams showing the state of change of the multipath center of gravity, and FIG. 10A is a table, and FIG. 10B is a graph. Further, FIGS. 10A and 10B are diagrams showing a case in which the frequency of the low-speed clock signals continues to fluctuate for a while and thereafter returns to the original frequency, in a situation in which the fluctuations in the multipath do not occur. This corresponds to a situation such as when one temporarily goes outside from indoors in which a heater is working and thereafter returns to the indoors.

As shown in FIGS. 10A and 10B, although the center of gravity varies for a while, the center of gravity converges to 1000 samples in due time due to the effects of the correction of the present invention.

Figure 11B:
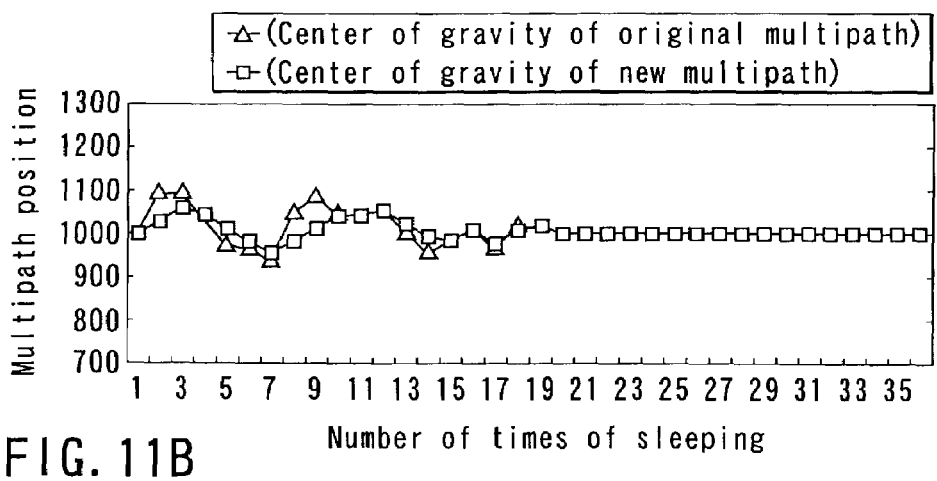

FIGS. 11A and 11B are diagrams showing the state of changes in the multipath center of gravity, and FIG. 11A is a table, and FIG. 11B is a graph. Further, FIGS. 11A and 11B are diagrams showing a case where the multipath continues to fluctuate for a while and thereafter returns to the original state in a situation in which fluctuations in the frequency of the low-speed clock signals do not occur.

As shown in FIGS. 11A and 11B, the fluctuations in the center of gravity are considerably severe at each moment. However, from a long-term standpoint, the center of gravity is controlled to converge to 1000 samples which is the initial position.

It should be noted here that the new center of gravity loosely changes as compared with the original center of gravity. This is an effect that the offset amount of the center of gravity position used for determining the correction value is limited by using the corrected upper limit value Move_limit32 as the upper limit.

Figure 12B:
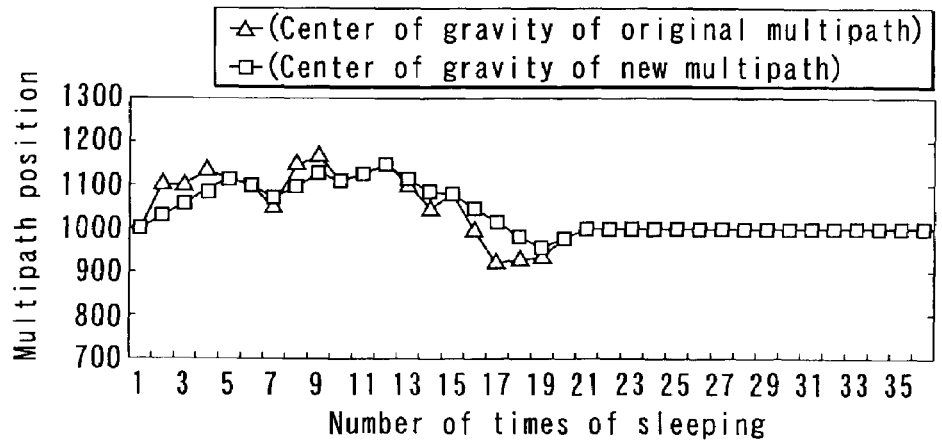

FIGS. 12A and 12B are diagrams showing the state of changes in the multipath center of gravity, and FIG. 12A is a table, and FIG. 12B is a graph. Further, FIGS. 12A and 12B are diagrams showing a case where fluctuations in the frequency of the low-speed clock signals and fluctuations in the multipath occur at the same period. This corresponds to a situation in an actual environment.

As shown in FIGS. 12A and 12B, the fluctuations in the center of gravity position are considerably severe at each moment. However, from a long-term standpoint, the center of gravity is controlled to converge to 1000 samples which is the initial position.

Next, description will be given regarding, due to the count number for determining the timing of the rising from the sleeping time being corrected in this way, the effect of the frequency offset of the low-speed clock signals can be compensated for.

When the multipath does not fluctuate and only the frequency of the low-speed clock signals fluctuates, the label value of the center of gravity position varies due to the fluctuations in the frequency of the low-speed clock signals. This is because the center of gravity position does not fluctuate, but the relationship between the path position and the label value is offset. Accordingly, at this time, the fluctuation amount of the center of gravity position corresponds to the offset amount of the label value, and thus, to the offset amount of the rising position. Then, by correcting one or both of the count number of the low-speed clock signals and the count number of the high-speed clock signals by the correction value determined in consideration of the fluctuation amount of the center of gravity position, the rising position can be corrected.

On the other hand, when the frequency of the low-speed clock signals does not fluctuate and only the multipath fluctuates, changes in the label value of the center of gravity position are caused by the fluctuations in the center of gravity position, and offset does not occur in the relationship between the center of gravity position and the label value. However, the fluctuations in the center of gravity position caused by the fluctuations in the multipath cannot be distinguished from the fluctuations in the center of gravity position caused by the frequency fluctuations of the low-speed clock signals.

Here, the change in the label value of the center of gravity position caused by the fluctuations in the center of gravity position is considered to be a change in the label value of the center of gravity position caused by the frequency fluctuations of the low-speed clock signals. Further, one or both of the count number of the low-speed clock signals and the count number of the high-speed clock signals are changed by the correction value decided in consideration of the changed amount of the label value of the center of gravity position. This works in a direction of offsetting the relationship between the center of gravity position and the label value.

However, from a long-term standpoint, the center of gravity position stays at the same timing. Namely, the center of gravity position is distributed into before and after timings around a given timing. Accordingly, from a long-term standpoint, in the direction in which the center of gravity position is offset, the increasing direction and the decreasing direction of the label value are mixed together. From the facts described above, two directions which are different from each other are mixed in the directions in which the relationship between the center of gravity and the label value is offset by the correction of the count number. As a result, the amount by which the relationship between the center of gravity and the label value is offset in accordance with the fluctuations in the multipath is limited to within a limited range.

Further, in the present embodiment, when the difference between the old center of gravity Wcenter_old and the new center of gravity Wcenter_new exceeds the corrected upper limit value Move_limit32, the fluctuation amount of the center of gravity is limited to the corrected upper limit value Move_limit32. Namely, the fluctuation amount of the center of gravity detected for deciding the correction value is at most the corrected upper limit value Move_limit32. On the other hand, in an actual environment, both fluctuations in the frequency of the low-speed clock signal and fluctuations in the multipath occur. Namely, the amount caused by the fluctuations in the frequency of the low-speed clock signal and the amount caused by the fluctuations in the multipath are included in the fluctuation amount of the center of gravity detected for deciding the correction value. From these facts, the maximum value of the amount caused by the fluctuations in the multipath which is included in the fluctuation amount of the center of gravity detected for deciding the correction value, is smaller than the corrected upper limit value Move_limit32.

From these facts, it is possible to keep the fluctuations in the relationship between the path timing and the label value small, and the offset of the path timing and the search window determined on the basis of the label value can be kept small. As a result, it is possible to correctly detect the path timing at the searcher 12, and to reliably receive incoming information.

Further, in the present embodiment, because the search window is set around the center of gravity position of the multipath detected the last time, path searching for a range in which the effective paths are distributed can be precisely carried out.

When the processing as described above is carried out, when a path whose energy is too low is used for determining the center of gravity, there is the fear that the error in the center of gravity position determined will increase. Further, for determining the center of gravity, the center of gravity determining section 14$d$ uses only paths whose energy is not less than the first threshold value determined in advance.

Moreover, when the total energy of the paths to be used for determining the center of gravity at the center of gravity determining section 14$d$ is too low, the determined center of gravity position lacks reliability. Thus, if the above-described total energy is less than the second threshold value determined in advance, the center of gravity determining section 14$d$ uses the old center of gravity Wcenter_old as is as the new center of gravity Wcenter_new. Further, at this time, the correction value deciding section 14$f$ uses the value of the correction value Adjust32old determined the last time as is as the correction value Adjust32new. Note that, as the total energy, it is possible to use, for example, the sum, an average value, or the like of the energies of the paths to be used for determining the center of gravity.

As a result, the correction of the count number of the low-speed clock signals and the count number of the high-speed clock signals in the next sleeping period is not carried out.

Namely, in the present embodiment, when the total energy of the paths used for determining the center of gravity is low to the extent of being lower than the second threshold value, the correction of the count number of the low-speed clock signals and the count number of the high-speed clock signals in the next sleeping period is not carried out.

Thus, correction based on a center of gravity position for which there is a fear of inaccuracy, is prevented from being carried out. Further in accordance therewith, the offset between the search window and the path timing can be steadily kept low.

However, if such a structure is utilized, the effects of the fluctuations in the frequency of the low-speed clock signals accumulate, and there is the fear that the next rising position will be offset even more.

Thus, in the present embodiment, the width of the search window is changed in accordance with the agreements shown in FIG. 13. In FIG. 13, the window width necessary for absorbing the phase shifts is regulated on the basis of the phase shifts shown in FIG. 7.

For example, when 1 DRX is set to 2.56 seconds, it can be understood from FIG. 7 that the phase shift appearing in 1 DRX is about 7.5 chips. The width of the search window steadily needed to correspond to the fluctuations in the multipath is ±77 chips. Therefore, the phase shifts can be absorbed at the default window width (±128 chips).

However, it can be understood from FIG. 7 that the phase shift appearing in 2 DRX is about 30 chips. Therefore, because there is the fear that the shift will not be able to be absorbed at the default window width, the window width is regulated to ±192 chips which is larger than the default width.

Hereinafter, the state of changing the window width will be concretely described.

When opening the PCH, first, for example, the center of gravity position in the state of the most recent multipath is determined as shown in FIG. 14A. In FIG. 14A, paths P11 to P14 are detected, and the center of gravity position Wcenter_new is determined to be 1020 samples.

Next, when rising from the sleeping period, as shown in FIG. 14B, the searcher 12 makes the timing, when a constant time has elapsed from the rising position, be the window-up position. In FIG. 14B, the rising position is offset by −20 samples due to the effect of the frequency offset of the low-speed clock signals. Therefore, the window-up position is also offset by −20 samples.

In FIG. 14B, paths P15 through P18 are detected, and the center of gravity Wcenter_new is 1040 samples. However, the energies of the respective paths are small, and the total energy is less than the second threshold value.

In such a case, the actual center of gravity position is ignored. Further, the center of gravity position Wcenter_new and the correction value Adjust32new are set as follows.

Wcenter_new=Wcenter_old
Adjust32new=Adjust32old

In FIG. 14B, the center of gravity position Wcenter_new and the correction value Adjust32new are set as follows.

Wcenter_=new=1020
Adjust32new=0

Namely, the center of gravity position Wcenter_new and the correction value Adjust32new are the values determined the last time as is. As a result, the correction of the count number of the low-speed clock signals and the count number of the high-speed clock signals in the next sleeping period is not carried out.

In FIG. 14C, the effects of the frequency offset of the low-speed clock signals are accumulated over 2 DRX, and the rising position is offset by −40 samples. Accordingly, the window-up position is also offset by −40 samples.

In FIG. 14C, because the correction of the count number of the low-speed clock signals and the count number of the high-speed clock signals in the immediately previous sleeping period is not carried out, the width of the search window is ±768 samples (±192 chips). Further, in FIG. 14C, paths P19 to P24 are detected. The paths P23, P24 are the paths which can be detected by widening the width of the search window.

However, if all the paths detected in the widened search window are intended to be used for determining the center of gravity position, there is the fear that the fluctuations in the center of gravity position will be too large. Further, if the fluctuations in the center of gravity position are too large, there is the fear that the correction of the sleeping period will not be able to be appropriately carried out.

Thus, for determining the center of gravity, the center of gravity determining section 14d uses only the paths detected from the range of ±512 samples. In FIG. 14C, only the paths P19 to P22, detected from the range in which the label value is from 508 samples to 1532 samples, are used for determining the center of gravity.

In this way, by suitably changing the width of the search window, it is possible to precisely detect the multipath. As a result, it is possible to precisely receive incoming information.

When 1 DRX is set to 5.12 seconds, the maximum value of the phase shifts at the time that 1 DRX elapses reaches about 30 chips (120 samples) as can be understood from FIG. 7. Therefore, there is the fear that the correction method of the present embodiment cannot absorb the phase shifts.

Thus, in the present embodiment, when 1 DRX is set to 5.12 seconds, operation is carried out in a similar way as when 1 DRX is set to 2.56 seconds. Namely, during the original sleeping period, it arises once from sleep at a timing similar to that when 1 DRX is 2.56 seconds. Further, in accordance with the state of the multipath at thus time, the count number of the low-speed clock signals and the count number of the high-speed clock signals relating to the remaining sleeping period are determined. Further, the remaining sleeping period is made to be the sleeping state on the basis of the count numbers.

In this way, even when the waiting period is a long period such as 5.12 seconds, it can be handled by the processing of the present invention.

Note that the present invention is not limited to the above-described embodiment. For example, in the above-described embodiment, although the starting timing and rising timing of the sleeping period are changed every sleeping period, these may be respectively periodic.

Further, in the above-described embodiment, although timing is taken at the rise of the low-speed clock signal and the high-speed clock signal, the timing may be taken at the fall thereof.

Moreover, determination which is flexible to a certain extent can be carried out, such as the corrected upper limit value Move_limit32 is determined on the basis of the frequency offset of the low-speed clock signals during the length (the maximum value or the average value) of the sleeping period, or the like.

Although the above-described embodiment respectively includes embodiments corresponding to the inventions according to the respective claims, it is not absolutely necessary to include all of them.

In addition, the present invention can also be applied to a communication apparatus which is not in accordance with 3 GPP such as N-CDMA, provided that the apparatus uses spread spectrum communication.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A spread spectrum communication apparatus which carries out radio communication by a spread spectrum communication method with base stations each belonging to any of a plurality of cells, and which is used in a communication system in which incoming information is sent from the base station at a known timing during waiting, the apparatus comprising:

a receiving section configured to receive the incoming information;

a detecting section configured to detect timings and energies of a plurality of paths corresponding to the received incoming information and relating to a transmitted signal from the base station belonging to a cell which is waiting;

a control section configured to control the receiving section and the detecting section so as to operate discontinuously before and after a predetermined sleeping period determined so as to avoid an arrival time of the incoming information;

a determining section configured to determine a center of gravity in a distribution of the timings of the plurality of paths on the basis of the timings and energies of the respective paths detected by the detecting section;

a first deciding section configured to decide a correction timing, within a range in which a timing difference between the correction timing and a timing of a center of gravity determined in a one-before operating period by the determining section does not exceed a predetermined lower limit time and an upper limit time, on the basis of the timing of the center of gravity determined in the one-before operating period by the determining section and a timing of the center of gravity determined in a last operating period by the determining section;

a second deciding section configured to decide a correction value on the basis of the correction timing decided by the first deciding section within the last operating period, the correction timing decided by the first deciding section within the one-before operating period, and the correction value determined within the one-before operating period;

a first generating section configured to generate a first clock signal having a first predetermined frequency;

a second generating section configured to generate a second clock signal having a second predetermined frequency lower than the first predetermined frequency;

a first clocking section configured to clock by counting the first clock signal within a first period which is part of the sleeping period;

a second clocking section configured to clock by counting the second clock signal within a second period which is a period of the sleeping period excluding the first period; and a third deciding section configured to decide, on the basis of the correction value, a first count number which the first clocking section counts in order to clock the first period and a second count number which the second clocking section counts in order to clock the second period, wherein the control section makes points in time, when the first clocking section and the second clocking section finish clocking the first period and the second period, respectively, be ending timings of the sleeping period.

2. A spread spectrum communication apparatus according to claim 1, wherein the first deciding section decides a new timing to be the timing of the corrected center of gravity when the difference between the new timing, which is a timing of the center of gravity determined by the determining section within the last operating period, and an old timing, which is a timing of an old center of gravity determined by the determining section within the one-before operating period, is larger than the lower limit time and smaller than the upper limit time; decides a timing obtained by subtracting the lower limit time from the old timing to be the timing of the corrected center of gravity when the difference between the new timing and the old timing is not more than the lower limit time; and decides a timing obtained by adding the upper limit time to the old timing to be a correction timing when the difference between the new timing and the old timing is not less than the upper limit time.

3. A spread spectrum communication apparatus according to claim 1, wherein the second deciding section decides the correction value in the last operating period by adding the difference between the correction timing and the timing of the old center of gravity determined by the determining section within the one-before operating period, to the correction value decided within the one-before operating period.

4. A spread spectrum communication apparatus according to claim 1, wherein the third deciding section comprises a fourth deciding section configured to decide a correction time by correcting a time included in the sleeping period on the basis of the correction value, the third deciding section comprises: a fifth deciding section configured to decide, as the second count number, a number of periods (which is an integer number) of the second clock signal included in a time obtained by subtracting a time clocked by the third clocking section from the correction time; and a sixth deciding section configured to decide, as the first count number, a number of periods (which is an integer number) of the first clock signal included in a time obtained by subtracting a time corresponding to the second count number determined by the fifth deciding section from the correction time, and the first clocking section comprises: a first count section configured to count the first clock signals from the starting timing of the sleeping period until a predetermined change next appears in the second clock signals; and a second count section configured to count a number obtained by subtracting the number counted by the first count section from the first count number decided by the sixth deciding section on the basis of the first clock signals.

5. A spread spectrum communication apparatus according to claim 1, wherein the control section operates the first generating section discontinuously before and after the second period.

6. A spread spectrum communication apparatus according to claim 1, wherein the lower limit time and the upper limit time are a negative number and a positive number of a number of periods of the first clock signal included in a time corresponding to a maximum value of accumulated phase errors which can arise in the second clock signals during one discontinuous receiving period.

7. A spread spectrum communication apparatus according to claim 1, wherein the detecting section uses only paths, which are positioned in a search window having a predetermined width around the timing of the center of gravity determined in the one-before operating period, as objects of detection of timing and energy.

8. A spread spectrum communication apparatus according to claim 1, wherein, for determining the center of gravity, the determining section uses only the timing of the path whose energy is not less than a predetermined first threshold value among the paths detected by the detecting section.

9. A spread spectrum communication apparatus according to claim 1, wherein the determining section uses the timing of the center of gravity determined in the one-before operating period as the timing of the center of gravity in the last operating period, when the total energy of the paths detected by the detecting section is not more than a predetermined second threshold value.

10. A spread spectrum communication apparatus according to claim 9, wherein the detecting section makes a width of a search window in the last operating period be larger than that in the one-before operating period, when in the one-before operation period, the determining section makes the timing of the center of gravity determined in the one-more-before operating period be as is the timing of the center of gravity in the last operating period.

11. A spread spectrum communication apparatus according to claim 10, wherein the detecting section changes the width of the search window in accordance with a continuous number of operating periods in which the determining section makes the timing of the center of gravity determined in the one-more-before operating period be as is the timing of the center of gravity in the last operating period in the one-before operating period.

12. A spread spectrum communication apparatus according to claim 1, wherein
an discontinuous receiving period formed from one operating period and one sleeping period is variable; and
when the set discontinuous receiving period exceeds a predetermined time, the control section sets the operating period at a period of 1/n (n is a predetermined integer of 2 or more) of the set discontinuous receiving period.

13. A method of controlling a spread spectrum communication apparatus which carries out radio communication by a spread spectrum communication method with base stations each belonging to any of a plurality of cells, the apparatus comprising:
a receiving section configured to receive incoming information sent from the base station at known timing during waiting;
a first generating section configured to generate a first clock signal having a first predetermined frequency; and
a second generating section configured to generate a second clock signal having a second predetermined frequency lower than the first predetermined frequency,
the controlling method comprising:
detecting timings and energies of a plurality of paths corresponding to the received incoming information and relating to a transmitted signal from the base station belonging to a cell which is waiting;
discontinuously carrying out operation of the receiving section and detection of the timings and energies of the plurality of paths before and after a predetermined sleeping period determined so as to avoid an arrival time of the incoming information;
determining a center of gravity in a distribution of the timings of the plurality of paths on the basis of the timings and energies of the respective detected paths;
deciding a correction timing, within a range in which a timing difference between the correction timing and a timing of the center of gravity determined in a one-before operating period does not exceed a predetermined lower limit time and an upper limit time, on the basis of the timing of the center of gravity determined in the one-before operating period and a timing of the center of gravity determined in a last operating period;
deciding a correction value on the basis of the correction timing decided in the last operating period, the correction timing decided in the one-before operating period, and the correction value decided in the one-before operating period;
clocking a first clocking period, which is part of the sleeping period, by counting the first clock signals;
clocking a second period, which is a period in the sleeping period excluding the first period, by counting the second clock signals; and
deciding a count number, which the first clocking section counts in order to clock the first period, and a count number, which the second clocking section counts in order to clock the second period, on the basis of the correction value,
wherein points in time when the first clocking section and the second clocking section respectively finish clocking the first period and the second period are made to be ending timings of the sleeping period.

14. A controlling method according to claim 13, wherein the decision of the correction timing is carried out by making a new timing be the timing of the corrected center of gravity when the difference between the new timing, which is a timing of the center of gravity determined by the determining section within the last operating period, and an old timing, which is a timing of an old center of gravity determined by the determining section within the one-before operating period, is larger than the lower limit time and smaller than the upper limit time; making a timing obtained by subtracting the lower limit time from the old timing be the timing of the corrected center of gravity when the difference between the new timing and the old timing is not more than the lower limit time; and making a timing obtained by adding the upper limit time to the old timing be a correction timing when the difference between the new timing and the old timing is not less than the upper limit time.

15. A controlling method according to claim 13, wherein the determination of the correction value in the last operating period is carried out by the second deciding section by adding the difference between the correction timing and the timing of the old center of gravity determined by the determining section within the one-before operating period, to the correction value determined within the one-before operating period.

16. A controlling method according to claim 13, wherein the decision of the correction time is carried out by correcting a time included in the sleeping period on the basis of the correction value;
the decision of the second count number is carried out by obtaining a number of periods (which is an integer) of the second clock signal included in a time obtained by subtracting the first period from the correction time;
the decision of the first count number is carried out by obtaining a number of periods (which is an integer) of the first clock signal included in a time obtained by subtracting a time corresponding to the second count number from the correction time; and
the clocking of the first period is carried out by, on the basis of the first clock signals, counting the first clock signals from the starting timing of the sleeping period until a predetermined change next appears in the second clock signals, and by counting a number obtained by subtracting the count number from the first count number.

17. A controlling method according to claim 13, wherein the lower limit time and the upper limit time are a negative number and a positive number of a number of periods of the first clock signal included in a time corresponding to a maximum value of accumulated phase errors which can arise in the second clock signals during one discontinuous receiving period.

18. A controlling method according to claim 13, wherein only timing of a path, whose energy is not less than a first threshold value among the detected paths, is used for determining the center of gravity.

19. A controlling method according to claim 13, wherein, in the determining of the center of gravity, the timing of the center of gravity determined in the one-before operating period is made to be the timing of the center of gravity in the last operating period, when the total energy of the detected paths is not more than a predetermined second threshold value.

20. A controlling method according to claim 19, wherein, when detecting the timings and energies of the plurality of paths, a width of a search window in the last operating period is made to be larger than that in the one-before operating period when the timing of the center of gravity determined in the one-more-before operating period is made to be as is the timing of the center of gravity in the last operating period in the one-before operating period for determining the center of gravity.

21. A controlling method according to claim 20, wherein the width of the search window is changed in accordance with a continuous number from the one-before operating period of an operating period in which the timing of the center of gravity determined in the one-before operating period is made to be as is the timing of the center of gravity in the last operating period for determining the center of gravity.

* * * * *